United States Patent Office 3,483,087
Patented Dec. 9, 1969

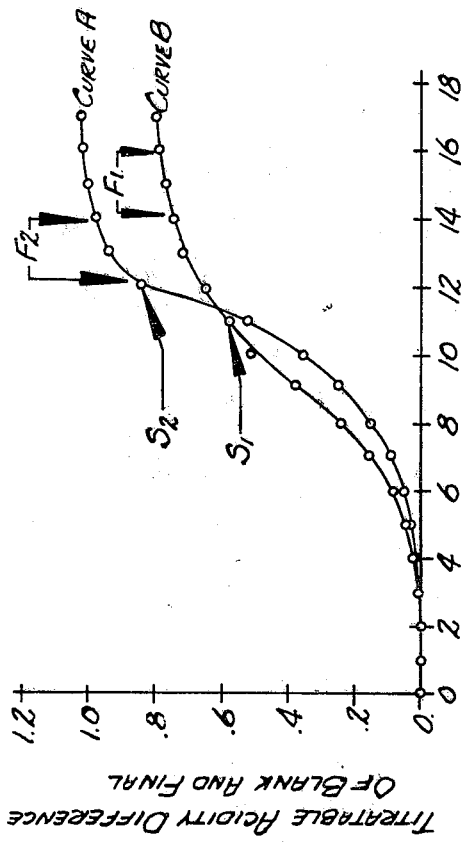

3,483,087
CHEESE STARTER CULTURE
Verle W. Christensen, Madison, Wis., assignor to Miles Laboratories, Inc., Elkhart, Ind., a corporation of Indiana
Filed Mar. 14, 1966, Ser. No. 534,225
Int. Cl. C12k 3/00; A23c 19/02
U.S. Cl. 195—96    5 Claims

ABSTRACT OF THE DISCLOSURE

Improved cheese starter cultures can be provided by cultivating lactic acid-producing bacteria in a buffered culture medium comprising an aqueous solution of a mixture of non-fat milk powder, ammonium orthophosphate and an alkali metal orthophosphate, stopping cultivation of said bacteria when the change in acidity of the culture medium falls within the range of from about 0.85 to 1.05%, cooling the cutivated bacteria culture so as to rapidly stop further growth of the bacteria, and then maintaining the so cultured lactic acid-producing bacteria at a temperature at least below $-100°$ F. and preferably at least $-300°$ F.

---

This invention relates generally to improvements in the manufacture of cheese. More particularly, the invention relates to the preparation and storage of lactic acid-producing bacteria which are used as starters in producing cheese.

In a typical process for manufacturing a cheese product, such as Cheddar cheese, milk and other necessary ingredients are placed in a vat and a bacterial starter culture is added to initiate the cheese forming reaction. The bacterial starter culture may comprise one or more strains of lactic acid-producing bacteria such as *Streptococcus lactis, Streptococcus cremoris, Streptococcus diacetilactis,* and associated microorganisms *Leuconostoc dextranicum* and *Leuconostoc citrovorum* and the like that produce little acid but contribute to flavor and texture and influence the growth of the active acid producers.

The characteristics of the starter culture are very important and practically the starter culture has greater influence on the quality of the cheese than any other factor. Minor changes in the composition of the starter may cause loss of activity, excessive gas production or changes in enzyme production which in turn may cause bitter or off-flavor, gas holes and poor body and texture in the cheese. Consequently, extreme care must be taken not only in producing the cheese starter cultures but also in maintaining them in good condition until ready for use in the cheesemaking process.

It is well known in the art that the quality of cheese differs according to the particular strains of lactic acid-producing bacteria and the conditions of their use in the cheesemaking process. In selecting strains suitable for cheesemaking, it is customary to isolate single strains having desirable cheesemaking characteristics, blend them together in various combinations and then by a method of trial-and-error select combinations that work successfully in the production of cheese. These selected strains are then normally freeze-dried (lyophilized) and stored to be used in preparing blended seed cultures which are also freeze-dried and sold to cheese manufacturers. These freeze-dried strains and blended cultures are stored at conventional freezing temperatures of about $-20°$ F. However, with this processing technique there is great lack of uniformity between various batches of freeze-dried cultures. In the process of freeze-drying there is considerable loss of viable bacterial cells.

The hardy ones survive and these are usually the gas-producing lactic acid bacteria. In addition, there is often mutation or changes in the surviving bacterial cells. One can never be sure that a seed culture is going to work satisfactorily from one time to the next. It has also been shown that on lyophylization, certain lactic acid bacteria gain or lose certain characteristics independent of environmental changes. This gain or loss is a permanent change and is found in all of the descendants of the parent cells. Starter cultures which have been prepared and stored in heretofore conventional manner are often found to be practically inactive or to produce excessive gas or serious off-flavor in the cheese, some carry with them a bacteriophage which inhibits their growth, some are very sensitive to phage in the cheese, plant and therefore perform satisfactorily only in a few vats and are unsatisfactory when used in successive vats.

Obviously the cheese industry desires that starter cultures be uniform in activity and remain stable for extended periods. Moreover, the starter cultures should exhibit characteristics which produce cheese of high quality. It is therefore a principal object of the present invention to provide bacterial starter cultures which meet the demands of the cheese industry.

A further object of the present invention is to provide a method for producing a bacterial starter culture useful in making cheese which affords relatively uniform results and remains stable during storage.

A still further object of the present invention is to provide a method for producing and storing a bacterial starter culture which affords relatively uniform results and remains stable for extended periods of time and which when used for its intended purpose will produce a high quality cheese.

In accordance with the broad aspects of the present invention, a cheese starter culture comprising lactic acid-producing bacteria is cultivated in suitable buffered media, preferably a bacteriophage-inhibitory culture medium for a certain critical time and then substantially immediately maintained at a temperature at least below $-100°$ F. and preferably below about $-300°$ F. until ready for use. The initial culturing of the starter culture in a suitable buffered medium for a specified time and maintenance of the culture at an exceptionally low temperature until use thereof result in a started culture which remains stable over extended periods of time and which uniformly and consistently produces cheese of high quality.

The process of the present invention is applicable to any of the conventional bacterial cultures normally used for producing cheese. Thus, the bacterial starter culture may comprise, for example, one or more strains of lactic acid-producing bacteria such as *Streptococcus lactis, Streptococcus cremoris, Streptococcus diacetilactis,* together with other microorganisms such as *Leuconostoc dextranicum* and *Leuconostoc citrovorum* and the like. The particular strain or blend of organisms to employ can vary and will depend upon the preferences of the cheesemaker. The present invention is therefore not limited to particular organisms or blends but, of course, the particular organisms employed should qualify as satisfactory cultures for producing cheese.

In practicing the present invention, the bacterial starter culture which can vary as to the bacterial organisms is cultivated or "ripened" in a buffered culture medium. The culture media which are employed in accordance with the invention are media which buffer the lactic acid produced by the organism without inhibiting the growth thereof and preferably are bacteriophage inhibitory. More particularly, the preferred culture media are those which will provide growth of at least about 1½ billion organisms per gram by the time the pH of the medium is lowered to about pH 5.00. The growth of the organisms can be determined by a standard plate count using the lactic culture medium as published in the "Journal of Dairy Science," 39:1611 (1956). Particularly preferred bacteriophage inhibitory culture media in dry form for use in the present invention are disclosed in my copending patent application Ser. No. 476,141, filed July 30, 1965, which issued as U.S. Patent No. 3,354,049 on Nov. 21, 1967, the disclosure thereof being incorporated herein by reference thereto. These culture media have the following composition:

|  | Broad operable range | Perferred |
|---|---|---|
| Nonfat milk powder | 40–90 | 67.5 |
| Mixture of ammonium and alkali metal orthophosphate salts (total) | 10–22.5 | 15.3 |
| In lieu of part of nonfat milk powder: | | |
| Demineralized whey powder | 0–50 | 17.0 |
| Dry pancreas extract | 0–1.5 | 0.2 |
| Lactose | 0–20 | |
| Dextrose | 0–45 | |

In using the above preferred culture media, the dry composition is stirred into water, generally in an amount from about 10 to 12.5%. The mixture is then heated to a temperature of about 180° to 200° F. for from 30 to 60 minutes or for 10 minutes under 10 pounds per square inch steam pressure. The media are then cooled to a temperature suitable for inoculation with the lactic acid bacteria.

It has been found in accordance with the present invention that culturing of the seed culture is very important. More particularly, the starter cultures are grown or ripened in the indicated buffered media at a temperature from about 64 to 90° F., preferably from about 68 to about 73° F. Culturing is carried out until the change in acidity of the culture medium is within the range of from about 0.85 to 1.05% and preferably from about 0.93 to 0.98%. The acidity of the culture medium is determined by testing 9 cubic centimeters of the medium against 0.1 N sodium hydroxide solution using 15 drops of phenolphthalein as indicator. The desired change in acidity of the culture medium generally occurs when the organisms are in a late logarithmic stage of growth and generally falls within the period of from ½ to 2 hours after initial coagulation. As a further rule of thumb, cultivation is generally stopped when the pH of the medium changes from pH 6.60 to 5.00. When this stage is reached further growth of the organisms is immediately stopped such as, for example, by rapidly cooling the culture with ice or ice water. Cooling of the culture to prevent further growth is effected rapidly such as, for example, by cooling the starter culture to a temperature of 45° F. or below in a period of one hour or less. For a starter culture that is cultured at about 72° F. it is preferable that cooling thereof to stop further growth be sufficiently rapid so as to reduce the temperature of the culture to 60° F. or below in a period of about one hour or less. Otherwise there will be a tendency for the bacteria to compensate in growth for the temperature change and this is undesirable.

Stopping cultivation or growth of the starter culture at the specified point is a radical departure from prior art practice but we have found this to be a very important factor in achieving the desired results.

Over-culturing of the starter culture, that is permitting growth of the microorganisms beyond the specified point, usually results in the starter culture becoming unbalanced with the result that the culture varies in acid producing ability, gas producing ability and fails to exhibit stability over extended periods of storage. On the other hand, under-culturing or stopping growth too soon results in a low bacteria count and requires use of excessive amounts of the starter culture for the production of cheese.

A characteristic curve indicative of the growth of the lactic acid-producing bacteria can be drawn for a particular cheese starter culture in a particular culture medium. In the drawing there are shown typical growth curves for the same cheese starter culture in two different culture media. Curve A was obtained with a starter culture comprising a blend of the lactac acid-producing bacteria *Streptococcus cremoris*, *Streptococcus lactis* and *Leuconostic* strains in a buffered culture medium as specified herein (Medium A) which was prepared by dispersing with heating the following composition in 620 cubic centimeters of water:

| | Grams |
|---|---|
| Nonfat dry milk solids | 70 |
| Diammonium phosphate | 4.2 |
| Monoammonium phosphate | 4.2 |
| Disodium phosphate | 4.2 |
| Pancreatic extract powder | 0.25 |

Curve B was obtained with the same blend of lactic acid-producing bacteria as above in a non-buffered culture medium (Medium B) composed solely of nonfat dry milk solids. In both cases the culture medium was formed by dissolving 11.8% of the dry solids in water.

Thus, with reference to the growth curves shown in the drawing, subject to the conditions of inoculation and temperature as specified therein, it can be seen in Curve B that the culture coagulates and produces a firm curd at an acidity difference of about 0.58% and that the culture is cooled when an acidity difference of about 0.75% is attained. This usually occurs about 14 to 16 hours after inoculation and is designated by the F1 area of the curve.

When one observes the typical growth curve for the same culture in a buffered medium as is employed in accordance with the invention (Culture Medium A), it can be seen from Curve A that the lag phase is slightly longer (period zero hours through eight hours incubation) than Curve B, but that the slope of the curve in the logarithmic stage is steeper. Coagulation occurs later with a difference in acidity of approximately 0.85% and the culture will be cooled for maximum value at 12 to 14 hours after incubation at which time the difference in acidity is about 0.98% which is designated by the F2 area of the curve.

The same culture obtained in F2 as compared to F1 will show approximately 25% to 50% more bacteria per gram and will be approximately 25% to 50% more active in producing acid in the cheesemaking process.

It can be seen that the present invention results in producing a larger number of very active bacteria in the late logarithmic stage of growth when using a buffered culture medium as compared to conventional methods where growth is stopped later in the stationary growth phase to obtain sufficient numbers for good starter usage practices. Therefore, growth can be stopped earlier in the buffered culture media in accordance with the invention to take advantage of the better growth and storage characteristics.

It should be understood that the correct culture growth depends on the starting acidity of the culture media. Culture media can be so constructed that the starting acidities vary in pH and titratable acidities. A buffered medium having a starting acidity of 0.75 and a pH of 6.60 before inoculation and incubation will be chilled when the acidity reaches a range of 1.65 to 1.80 (a difference within the range of 0.85 to 1.05%) and a pH of 5.00 after inoculation and incubation. A buffered medium having an acidity of 0.60 and a pH of 6.60 before inoculation and incubation will be chilled when the acidity reaches a range of 1.50 to 1.65 and a pH of 5.00 (a difference within the range of 0.85 to 1.05%). These acidities are important to give the greatest number of organisms with the proper growth characteristics needed to produce good results in the cultured product.

The importance of stopping growth at the point embraced by the area F2 in Curve A is emphasized by the fact that the culture cultivated in Medium A produced only 79 microliters of gas whereas the culture cultivated in Medium B when ripened for 16 hours produced 336 microliters of gas.

Gas production has been found to be one of the most important functions of a culture in the manufacture of high-quality cheese of all types. A simple procedure for measuring gas production is in the literature and is published in Technical Paper No. 1010 of the Oregon Agricultural Experiment Station, Corvallis, Oregon. This paper discusses the effects of a culture on floating curd in cottage cheese. It has also been found that in hard cheese types, such as Cheddar cheese, excessive gas production as determined by the above procedure causes defects that previously were attributed to other causes. For example, cheese that was graded down for being fruity, or fermented, or lacking in flavor, was thought to be caused by contaminating microorganisms. However, this has been found to be related generally to the culture. Thus, in practice of the present invention it is preferred to employ cultures for cheesemaking which do not produce more than 250 microliters of gas according to the above test procedure. When cultivation of the starter cultures is accomplished in accordance with the present invention the gas production thereof will generally be acceptable.

When conditions of gas production are high, the cheese will be down-graded to where a serious economical loss develops. In the case of cottage cheese, the cheese may be disposed of in animal feed channels, whereas in Cheddar cheese, it may only go into process cheese products.

Cultures ripened longer than desired also show a tendency to be erratic in the cheese vat in producing acid. For example, a starter culture when ripened to the proper acidity in 13½ hours developed a change in acidity of 0.96% and resulted in cheese milling uniformity through 12 vats on milling acidities of 0.55 to 0.65 acid. This same culture when ripened for 16 hours developed a change in acidity of 1.07% and resulted in 7 vats of cheese with acidities of 0.55 to 0.65 acid with top quailty grading, but other vats varied and ranged from 0.35 to 0.50 acid under the same conditions of manufacture and resulted in less than top grade cheese.

Cultures ripened longer than desired also showed what is known as poor carry-over qualities. It is customary for cheese manufacturers to use a starter for as long as 4 days to give them a starter rotation program. Cultures ripened to the proper acidity will produce good acids in cheesemaking with little starter adjustment each additional day of storage. Cultures ripened too long will require greater amounts each day to produce required acid development in the cheese. For example, a starter culture when ripened to a difference in acidity of 0.94% in 14 hours required only 10 additional pounds of starter on the third day of use to give proper acid development so that milling acidities of the cheese were 0.55 acid. In contrast, the same starter culture when ripened to a change in acidity of 1.07% in 16 hours required 70 more pounds of starter to result in a milling acidity in the cheese of 0.50 under the same conditions of manufacture.

After preparing the starter seed cultures as above described, the starter cultures are substantially immediately stored and continuously maintained at a low temperature at least below −100° F. In one preferred embodiment the starter cultures after preparation are stored in contact with liquid nitrogen which maintains the temperature of the starter culture at a low temperature, such as on the order of about −300° F. or lower, although the advantages of the invention are achieved if the starter cultures are maintained at a temperature of −100° F. or below. Storage of the seed cultures in contact with liquid nitrogen as a refrigerant insures that the culture maintains its uniformity and stability over extended periods of time.

The uniformity and stability of lactic acid-producing bacteria prepared and stored in accordance with this invention is shown by the following example for preparing a seed culture by the process described: A specific variety of lactic acid-producing bacteria composed of equal blends of *Streptococcus cremoris,* strains #9625, #144F, and #11E obtained from the stock of Oregon State University, was given tests to ascertain its cheesemaking qualities:

SPECIAL ACTIVITY AND GAS TESTS

| Transfer | Developed acidity 14 hrs. 71° F. | Acidity test (Titratable acidity) | | Microliters of gas produced |
| --- | --- | --- | --- | --- |
| | | 6 hrs., 89° F. | 6 hrs., 103° F. | |
| Initial | | .78 | .34 | None. |
| No. 1 | 0.97 | .77 | .32 | 1.5 |
| No. 2 | 0.90 | .77 | .30 | None. |
| No. 3 | 0.90 | .76 | .30 | None. |

The above test data was obtained as follows: A 100 milliliter bottle of sterilized medium is inoculated with 1% (1 ml.) of culture after the medium has been tempered to exactly 71° F. It is incubated at this temperature in a water bath for 14 hours. After cooling and testing, a similar incubation is followed with an inoculation from this particular culture until 4 transfers are made over a period of at least 4 days. After each transfer, 3 to 5 tests are made as follows:

(a) Standard acid test common to the industry. This consists of a 9 milliliter volume of material to be tested titrated to the phenolphthalein end-point with 0.1 N postassium hydroxide.

(b) Activity test—a 11% solids nonfat milk media in regular tap water is prepared with pretested powder for bacterial growth. It is sterilized by an autoclave for 12 minutes at 10 pounds pressure in units of 99 milliliters per bottle. These bottles are tempered to 89° F. and inoculated with 1 milliliter of the incubated and cooled culture from each transfer. After 6 hours incubation, they are checked for actidity produced. The acidity shows the acid-producing characteristics of the culture.

(c) The same test as listed in (b) above may also be run at 103° F. to show how well the culture grows at this temperature which is the temperature most cheese curd is heated to in the cheesemaking process.

(d) The culture after the first transfer and fourth transfer is tested for gas by the test previously listed in Technical Paper #1010 of the Oregon Agricultural Experiment Station of Corvallis, Oregon.

(e) A standard plate count may be made using the lactic agar culture medium as published in the "Journal of Dairy Science" 39:1611 (1956).

One thousand milliliters of this culture was prepared in a phage-resistant buffered medium, Medium C, and cultured for 14 hours at 71° F. using a 1% inoculation. The buffered culture, Medium C, had the following composition:

| | Percent |
| --- | --- |
| Pretested nonfat milk powder | 67.6 |
| Demineralized whey powder | 16.9 |
| Diammonium phosphate | 5.1 |
| Monoammonium phosphate | 5.1 |
| Disodium phosphate | 5.1 |
| Dried extract of pancreas powder | 0.2 |
| | 100.0 |

When the change in acidity reached 0.96% it was cooled immediately to 40° F. in ½ hour. Then special plastic vials were filled with 1.2 milliliters of the cooled culture using a sterile syringe. These vials were then immediately immersed in liquid nitrogen and the temperature lowered to the temperature of the coolant (−300° F.) in less than 1 minute. It was then stored. Subsequently in use a vial was then removed and thawed and transferred under aseptic conditions into a 100 milliliter sterile phage-resistant buffered Medium C (this is transfer #1, $T_1$). It was incubated at 71° F. for 14 hours reaching a developed acidity of 0.97%. Similar results were obtained when the four tests described above were conducted.

The $T_1$ culture above was used to inoculate a larger amount of the same culture medium. One gallon of culture Medium C was prepared and sterilized and cooled to 71° F. It was inoculated using 38 milliliters of $T_1$ culture above. This medium was incubated at 71° F. for 14 hours reaching a developed acidity of 0.97% and is identified as transfer #2, $T_2$.

Subsequently, 100 gallons of bulk starter medium were prepared by dissolving culture Medium C at 11.8% solids in water. After sterilization it was cooled to 71° F. and inoculated with the previous 1 gallon, $T_2$. It was ripened for 14 hours and attained a developed acidity of 0.95%. It was then cooled immediately to 45° F. within one hour.

TESTS MADE ON THIS BULK STARTER SHOW

Activity test, 6 hours, 89° F., (good clot) _____ 0.75
Microliters of gas _____ None
Total count/1 gram _____ 2,600,000,000

Determined as previously indicated.

One hundred and twenty pounds (120) of this bulk starter was taken to a cheese plant and used to inoculate 15,000 pounds of milk. The manufacturing acidities were:
(1) 0.23 when the whey removed.
(2) 0.33 when cheese was packed.
(3) 0.62 when cheese milled.

The cheese was stored at 38° F. and graded after 3 days and showed good cheese characteristics. The cheese was graded 6 months later by a Federal Grader and graded Grade A, or Wisconsin State Brand. Flavor and body texture were excellent.

Similarly, 30 additional vats of cheese were made with this culture obtaining normal manufacturing acidities grading Grade A.

Subsequently, this culture was checked for storage characteristics in liquid nitrogen. As shown in the following table the plate count and activity tests of the starter culture (after one year's storage) were substantially the same as when the samples were prepared and stored initially.

CULTURE STORED AT −300° F

| Time | Plate count (billions of organisms/ml.) | Activity test 6 hrs. at 89° F. |
|---|---|---|
| 0 | 2.8 | 0.70 |
| 2 weeks | 2.8 | 0.73 |
| 1 month | 2.6 | 0.77 |
| 4 months | 2.8 | 0.73 |
| 1 year | 2.6 | 0.74 |

Those modifications and equivalents which fall within the spirit of the invention and the scope of the appended claims are to be considered part of the invention.

I claim:
1. A process of preparing and maintaining a cheese starter culture which comprises cultivating lactic acid-producing bacteria in a buffered culture medium comprising an aqueous solution of a mixture of non-fat milk powder, an ammonium orthophosphate and an alkali metal orthophosphate wherein the total amount of said phosphates is from about 10 to about 22.5 weight percent of said mixture, stopping cultivation of said bacteria when the change in acidity of the culture medium falls within the range of from about 0.85 to 1.05%, cooling the cultivated bacteria culture so as to rapidly stop further growth of the bacteria, and then maintaining the so-cultured lactic acid-producing bacteria at a temperature at least below −100° F.

2. The process according to claim 1 wherein cultivation of the said bacteria is stopped when the change in acidity of the culture medium falls within the range of 0.93 to 0.98%.

3. The process according to claim 1 wherein cultivation of the lactic acid-producing bacteria in a buffered culture medium is carried out at a temperature of from about 64 to about 90° F.

4. The process according to claim 1 wherein cultivation of the lactic acid-producing bacteria in a buffered culture medium is carried out at a temperature of from about 68 to about 73° F.

5. The process according to claim 1 wherein the cultured lactic acid-producing bacteria are maintained at a temperature of about at least −300° F.

References Cited

UNITED STATES PATENTS 3,354,049    11/1967    Christensen _____ 99—59 X

OTHER REFERENCES

Comman et al., Journal of Dairy Science, June 1963, vol. 46, no. 6, page 609.

Cardwell et al., Journal of Dairy Science, vol. 42, no. 2, 1959, pages 388–389.

Davis, Cheese, vol. 1, 1965, American Elsevier Publ. Co., New York, pages 237–238.

A. LOUIS MONACELL, Primary Examiner

D. M. NAFF, Assistant Examiner

U.S. Cl. X.R.

99—59, 116